United States Patent

Brandt et al.

[15] 3,685,018

[45] Aug. 15, 1972

[54] PROGRAM CONTROLLED DATA PROCESSING INSTALLATION FOR CARRYING OUT SWITCHING PROCESSING IN A TELEPHONE EXCHANGE

[72] Inventors: Fritz Brandt; Wolfram Ernst, both of Munich; Dieter Voegtlen, Starnberg, all of Germany

[73] Assignee: Siemens Aktiengesellschaft, Berlin and Munich, Germany

[22] Filed: March 20, 1970

[21] Appl. No.: 21,340

[30] Foreign Application Priority Data

March 21, 1969 Germany..........P 19 14 576.7

[52] U.S. Cl...............................................340/172.5

[51] Int. Cl...............................................G06f 9/00

[58] Field of Search..................................340/172.5

[56] References Cited

UNITED STATES PATENTS

| | | | |
|---|---|---|---|
| 2,840,705 | 6/1958 | Scully | 340/172.5 X |
| 3,029,414 | 4/1962 | Schrimpf | 340/172.5 |
| 3,142,820 | 7/1964 | Daniels | 340/172.5 |
| 3,434,111 | 3/1969 | Schmidt et al. | 340/172.5 |

*Primary Examiner*—Raulfe B. Zache
*Attorney*—Birch, Swindler, McKie & Beckett

[57] ABSTRACT

A program controlled data processing installation particularly useful with telephone exchange switching is described. The system includes an information processing mechanism which is controlled by a program control mechanism. The processing mechanism receives binary signals which are then processed and a determination of their ultimate utilization made. The system also selects the binary signals which will be operated on from among several available and requiring operation.

7 Claims, 4 Drawing Figures

PROGRAM CONTROLLED DATA PROCESSING INSTALLATION FOR CARRYING OUT SWITCHING PROCESSING IN A TELEPHONE EXCHANGE

CROSS-REFERENCE TO RELATED APPLICATIONS

Priority corresponding German application No. P 19 14 576.7, filed Mar. 21, 1969 is claimed.

BACKGROUND OF THE INVENTION

Program controlled data processing installations are utilized not only for the processing and evaluation of information which is already present at the beginning of the carrying-out of the predetermined program, they are also used to consider new external information arriving during the processing of the program. Therefore such an installation operates as a so-called "real-time-installation" such as, for example, described in German Pat. No. 1,278,150.

A real-time-installation is used, for example, in carrying out the switching processes in a telephone exchange. The invention is particularily concerned with such an installation; however, it can also be used advantageously in a data processing installation wherein no external information is present. In each type of operation information is directed from a program-controlled data processing installation to a program control and storage mechanism in a known manner. The information directing and forwarding system controls, with the aid of so-called command words, the information processing, which takes place in an information processing mechanism. The information processing mechanism includes at least one operation register for the reception of information which is to be processed or which has already been processed as described, for example in Speiser: "Digital Calculators," 1965, page 28. The invention shows how such a data processing installation can be developed in especially suitable manner, making possible, among other things, the faster processing of a predetermined program and also making variation of the program easier. This considerably facilitates the use of the installation. Such an improvement is especially useful as compared to existing improvements in the basic electrical circuits as shown, for example in Speiser: "Digital Calculators," page 398.

BRIEF SUMMARY OF THE INVENTION

The invention is directed to a program controlled data processing installation which includes a program control mechanism, having a storage mechanism, and an information processing mechanism which is controlled by the control mechanism for information processing within the processing mechanism. The processing mechanism includes at least one operation register which receives information to be processed or which has been processed, for several binary signals. The invention is especially suitable for carrying out switching processes in a telephone exchange.

The data processing installation is characterized by the fact that the information processing mechanism includes a selection circuit for making a selection from among the binary signals representative of the information received in the operation register and determining the further utilization of the selected signals. Because the selection circuit is included in the information processing mechanism and can carry out a selection process very rapidly, the processing of a predetermined program will not cause excessive loading of the system, even in the event of frequent selection processes. In existing systems several command words are needed which must determine a stage-by-stage completion of the selection process. Furthermore, a selection process can be modified in a very little time. This is facilitated because of the fact that the selection circuit cooperates with the information processing mechanism. This is done by way of an operation register which is additionally provided in the information processing mechanism, and also by way of the information received in the operation register. The predetermined manner of the selection can be thus determined.

BRIEF DESCRIPTION OF THE FIGURES

The manner in which the selection circuit contained within the information processing mechanism is utilized to carry out selection processes is explained with reference to the drawings wherein.

DETAILED DESCRIPTION

Figure 1:
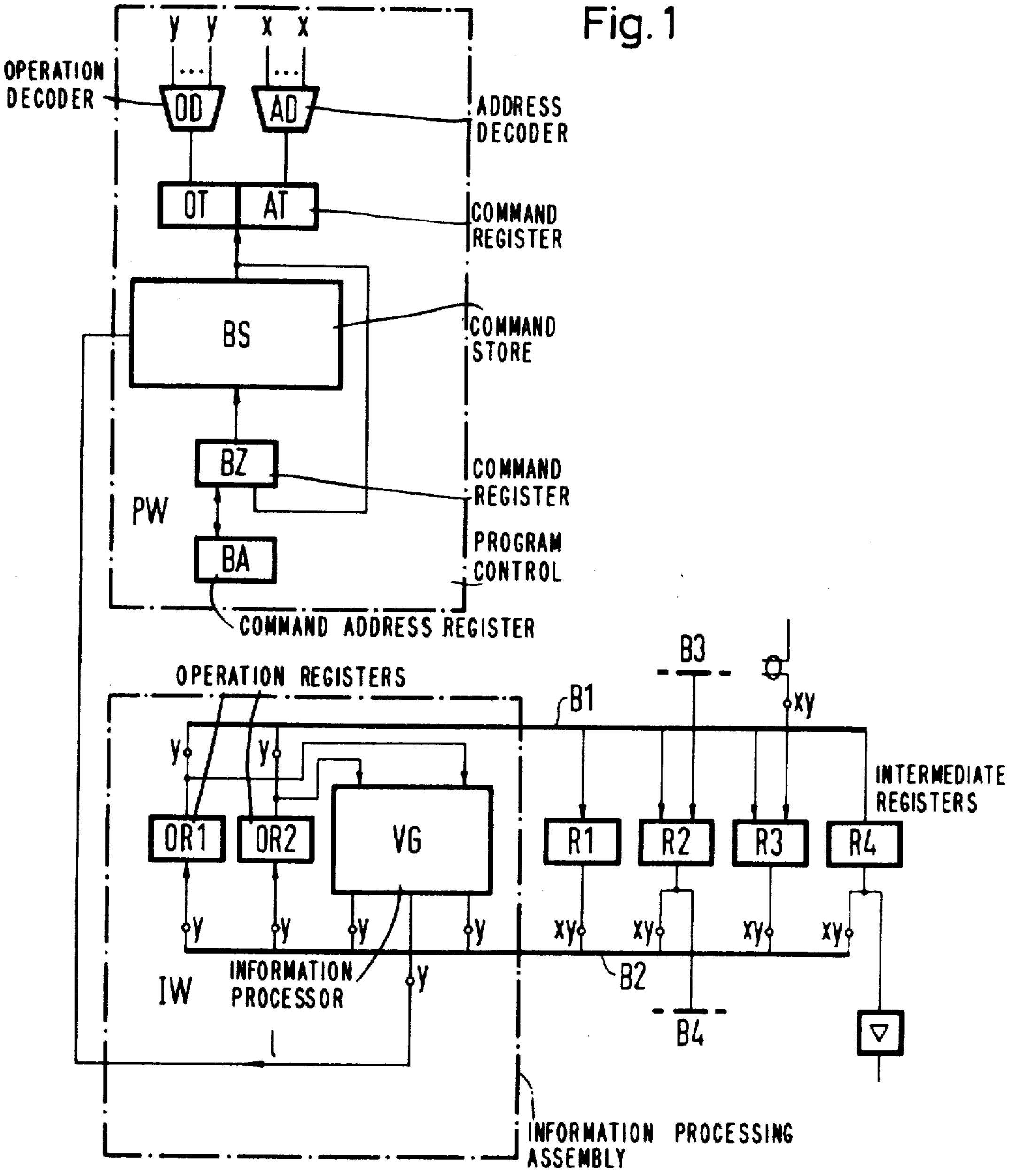
FIG. 1 is a schematic view of the entire data processing installation.

The data processing installation shown in FIG. 1 includes a program control mechanism PW and an information processing mechanism IW. Program control mechanism PW includes a command store BS wherein command words are called up with the aid of command address register BA and command meter BZ. The command words are thereafter conveyed to command register OT–AT. The part OT of the command register which receives an operational part of a command word, is connected to operation decoder OD. The part AT of the command register which receives an address part of a command word is connected to address decoder AD.

Operation decoder OD has several outputs from which lines,, which are not shown individually, lead to other portions of the data processing installation. The signals on these lines initiate the operations dictated by the information signals.

Address decoder AD has several outputs from which lines, not shown, lead to other systems of the data processing installation, from which information is called up, or to which information is conveyed, as required. The places to which the aforesaid lines lead are also designated by *y* and *x*. These are switching centers which are switched before the inputs or outputs of the other systems in question information processing mechanism IW includes two operation registers OR1 and OR2, as well as specific systems for the information processing, which are all together designated. VG.

Intermediate registers R1 . . . . R4 are provided for the purpose of intermediate storage of information, for short and also for longer periods of time. Intermediate register R2 has access to distributor lines B3 and B-4 which, for example, lead to other, but similar, data processing installations, so that several such data processing installations can work together. Othere external systems supply external information which must be considered during the processing of a program over intermediate register R3. These systems can possess ring cores, the operational condition of which is ascertained over intermediate register R3. Therefore intermediate register R3 is at the same time also used as a reading register. From the intermediate register R4 information wored-up in the information processing can be forwarded to other systems, which is indicated by an outgoing line which is connected to an amplifier. Under the participation of intermediate register R2 or R3, the data processing installation shown in FIG. 1 operates as a real-time-installation.

The operation registers and the intermediate registers are connected with each other over distributor lines B1 and B2. The distribution of information among these registers can be controlled with the aid of the already mentioned switching centers, which are inserted into these connections and in turn are connected to the outputs $y$ and $x$ of the operation decoder and the address decoder for their control. The switching centers are designated, corresponding to the connections intended in each case by $y$ or by $xy$.

Figure 2:
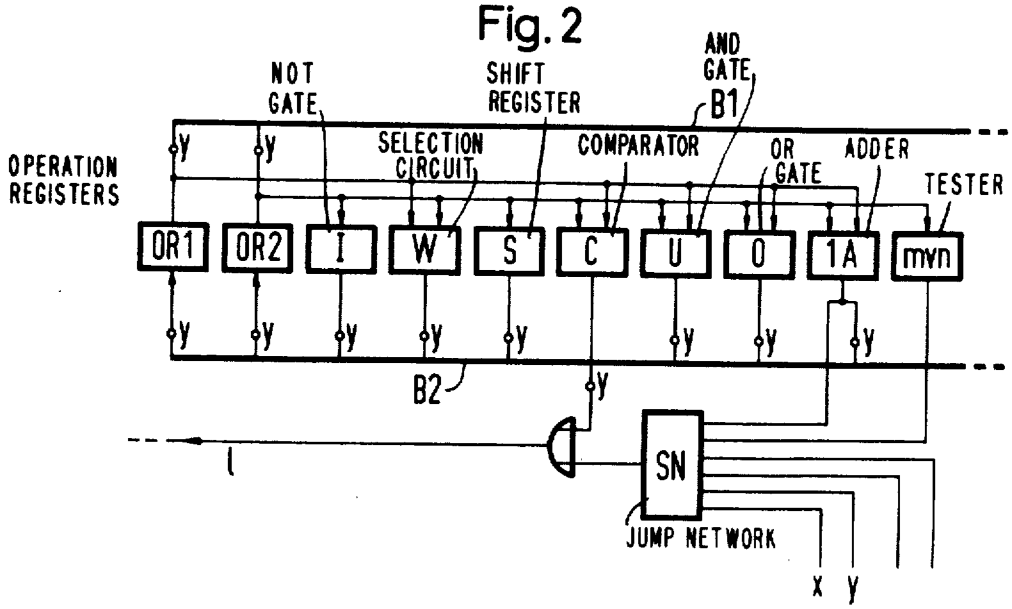
FIG. 2 is a block diagram of the information processing mechanism.

FIG. 2 is a detail of block VG of FIG. 1 and shows, in addition to the distributor lines B1 and B2 and the operation register OR1 and OR2, the specific systems for the information processing pertaining to information processing mechanism IW. Information processor VG includes the NOT-gate I, selection circuit W, shifting element S, comparison element C, AND-gate U, OR-gate O, adding element 1A and a testing element mvn. These circuits are in each case used for those operations for which they are suited as indicated by their designations. Comparison element C serves to supply conditional shift commands which act on the command store BS of program control mechanism PW over line 1. Such shift commands can also be supplied under participation of other systems which act together over the shift circuit network SN. Of special interest here is the selection circuit W which carries out, in predetermined manner, the selection and determination of the utilization of a binary signal from among the binary signals representative of the information received in the operation register. If the information in question is in operation register OR1, it is conveyed to the selection circuit W over the line connecting from the operation register and the selection circuit. After the selection process occurs in selection circuit W, the selected binary signals are forwarded, over the line leading therefrom to distribution B2, to another system, for this operation the switching center y, which is connected into the distribution line, is suitably controlled with the aid of the operation part of the command word which simultaneously appears in command register OT–AT, under participation of operation decoder OD. At the same time the switching center is controlled in a corresponding manner and is switched ahead of the inputs of the systems receiving the binary signals. Such a system can also be one of the intermediate registers R1 . . . R4 to which a path leads over one of the operation registers.

Through the selection and determination of the further use of the binary signals representative of information received in an operation register, different tasks can be solved and performed. If the program controlled data processing installation is equipped to carry out switching processes of a telephone exchange, then for example the subscriber connection which will be processed at that moment, will be selected from several requests which simultaneously present connection requests. The selection process is accomplished in the selection circuit. In the selection circuit the binary signals which represent the information just received in the operation register are initially used to designate from among a group of subscriber connections, those connections which answer. This is possible because the binary signals, representative of answering connections, possess one binary value, while the binary signals representative of subscriber connections not answering possess another binary value. Such information can, for example, have reached the actuated operation register with the aid of intermediate register R3. Therefore switching center $xy$, which is switched after the outputs of intermediate register R3, and switching center y, which is switched before the operation register in question, are suitably controlled with the aid of a command word over operation decoder OD and address decoder AD. The binary signals are conveyed from the initiated operation register to selection circuit W over the lines connecting them. In the selection circuit W the binary signals are subjected to a selection process, which considers only those which are assigned to subscriber connections which answered. A single one of these binary signals representative of an answered subscriber connection is forwarded over switching center $y$ and accordingly the subscriber connection to be considered first within the course of the program is determined.

Another function which can be performed with the aid of the selection circuit W is the determination of a connection path through the switching matrix of a telephone exchange which is available for a waiting connection request and which has not already been selected. In this case the individual binary signals of the information located in the initiated operation register are assigned to the individual path segments of a group of path segments which are, for example, in the same connecting stage of the switching matrix. The selection of at least one of these path segments takes place in a manner similar to that described before for a subscriber connection. It can also be meaningful to determine, instead of one path segment available for use, for example two such path segments which are considered within the further course of the program. Operation of a selection program in this manner can lead to the determination of the entire connection path which connects two subscriber connections of the telephone exchange through the switching matrix. In this case too, external information which previously arrived over an intermediate register is affected by the selection. The result of a selection is then utilized by forwarding it over an intermediate register to the switching matrix for the setting of crosspoint contacts.

Selection circuit W can also be used if the selection concerns internal information. Thus, for example, a selection from among several intermediate results which are present in intermediate registers and have already accrued in the processing of the predetermined program can be made.

Because the selection and determination of the further utilization of the binary signals are made from the binary signals representing information received in the operation register, it is easier to choose the manner of selection of the signals. Thus, for example, a sequence can be chosen in which the binary signals representative of information are to be considered in the selection. Additionally, the staring point of the sequence can be shifted for every selection process. The information which determines the chosen manner of selection is suitably received in an operation register provided in the information processing mechanism. If, for example, operation register OR1 is equipped to receive the information which is represented by the binary signals among which a selection is to be made, then the information which determines the predetermined manner of selection is received in operation register OR2. This information is supplied by the program control mechanism and arrives thereover a path which is not shown. However, it can also arrive there from another information source. In every instance the information can further be changed within the course of the information processing; for example, the starting point of the sequence can be shifted by one place for each selection process by utilizing shifting elements.

The selection process can be carried out in especially suitable manner by supplying the additional operation register OR2, with exactly as many binary signals as the original operation register OR1. Operation register OR1 in each case receives the information which is subjected to a selection. The binary signals in different operation registers are then assigned to each other in pairs. The starting point of the sequence to be considered in selection, is determined, in the additional operation register OR2. For example, the selection is made with the aid of a binary signal which is different from the remaining binary signals.

Additional details of the operating register are found in U.S. application Ser. No. 21,315 filed Mar. 21, 1970 by Fritz Brandt and Wolfram Ernst and assigned to the assignee of the instant invention.

The selection circuit includes switching stages individually assigned to the binary signals to be processed and includes a cascaded plurality of unilateral conduction elements which are individually arranged in the switching stages. The unilateral conduction elements are dependent on voltage or current direction for their transmission properties. U.S. Pat. No. 3,051,793, and 3,148,247 and German Pat. No. 1,215,212 fully describe systems which operate in this manner. Each switching stage receives a potential which correspondes to the binary signal representative of the information to be subjected to the selection. The switching stages are coupled together with electronic switches. The only one of the switches which is nonconducting or open is the one to which the binary signal, which determines the starting point of the information sequence, and which is the sequence selection assigned.

Figure 3:
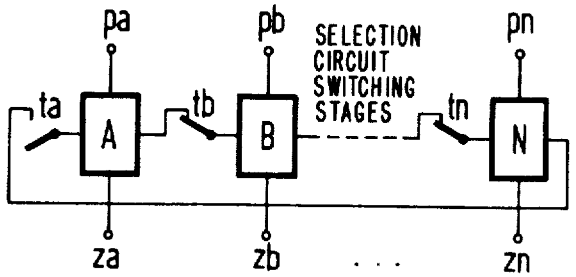
FIG. 3 is an example of a multi-stage selection circuit, illustrated schematically.

An example for such a selection circuit is shown in FIG. 3. The selection includes switching stages A, B . . . N. These switching stages are coupled through contacts *ta, tb . . . tn*. Contacts *ta, tb . . . tn* are shown as relay contacts because of the schematic illustration; however, they are preferably electronic switches. Contact *ta* is not conducting, or open; while the others are closed or conducting. The binary signals which represent the information to be subjected to selection are conveyed to inputs *pa, pb . . . pn* of the selection circuit. The binary signals representative of the information which determines the selection, individually determine the operational position of the electronic contacts *ta, tb . . . tn*. As shown in the circuit of FIG. 3 the condition of the binary signal influencing contact *ta* differs from the remaining binary signals of the information which determines the manner of selection, and it therefore follows that only contact *ta* is non-conducting. The starting point of the sequence for the selection process carried out by the selection circuit according to FIG. 3, is therefore determined, and accordingly those binary signals which are conveyed to the inputs *pa, pb . . . pn*, are considered to determine which of them have such a binary value that they come into consideration for the selection. Ordinarily, the selection circuit is arranged in such a way that after the selection process is completed the outputs *za, zb . . . zn* to which the selected binary signal was conveyed supply an output signal. The details of the manner in which the selection circuit which includes the plurality of switching stages operates is described in German Patent No. 1,215,777, and in particular FIG. 2 and the description thereof in col. 7, line 39 to col. 10, line 35.

Figure 4:
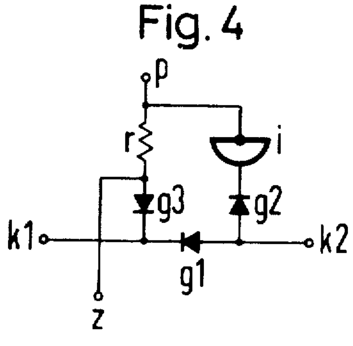
FIG. 4 is a schematic of a single stage of the selection circuit.

A switching stage useful in a selection circuit for the invention system can be developed in different ways; one example is shown in FIG. 4. This switching stage includes three diodes *g1, g2* and *g3* which are, as is well known, voltage direction-dependent with regard to their transmission properties. Also the diodes *g1, g2* and *g3* are rectifiers as is well known. The switching stage also includes resistor (r) and NOT-gate (i).

The mode of operation of such a switching stage is described in German Pat. No. 1,215,777, col. 10, line 36 to col. 11, line 26. A binary signal which is to be considered in the selection process is conveyed to the binary input terminal p of the switching stage. For switching to occur a positive potential must appead at inlet *p*. In addition, when a positive release potential appears at switching input terminal K1, then the junction of resistor (r) and diode *g3* is also subjected to a positive potential. A positive output signal then appears at output terminal *z*. This indicates that the binary signal present or binary input terminal *p* was selected.

The NOT-gate *i*, the input terminal of which is connected to input terminal *p* supplies negative potential at its output terminal. The negative output of NOT-gate *i* is conducted by diode *g2* and appears as blocking potential to diode *g1* and thus blocks output terminal *k2* diode *g1*, therefore prevents the compensation of the potentials between switching input terminal *k1* and switching output terminal *k2*. The adjacent switching stage which is connected by a switch to switching output terminal *k2* now contains no positive release potential at its switching input terminal and as a consequence this adjacent switching stage can not supply a positive potential at its output terminal. It therefore follows that because of interaction with all remaining switching stations to which positive potential is applied as a binary signal, only that switching stage which is "the least removed" from the non-conducting contact ta in the direction from switching stage A to switching stage N, (FIG. 3) supplies a positive output.

What is claimed is:

1. In a program controlled data processing system for a telecommunication exchange installation having a program control means with associated memory and information processing means controlled by said program control means, said information processing means including at least one operation register for receiving from several binary signals one of information to be processed and processed information the improvement comprising:

selection circuit means in said information processing means for making a selection from the binary characters of the information to be processed and the processed information in said operation register for determining the utilization of said information in a predetermined manner, distribution line means for connecting the results of the operation of said selection circuit means to other portions of said information processing means, means connecting the outputs of said selection circuit means to said distribution line means and means connecting the inputs of said selection circuit means to the outputs of said operation register.

2. The program controlled data processing system defined in claim 1 wherein said selection circuit means includes a plurality of series connected switching stages, each said switching stage being associated with binary characters belonging to a predetermined piece of information thereby determining a sequence in which binary characters belonging to a piece of information are considered in the selection.

3. The program controlled data processing system defined in claim 2 wherein said switching stages include connecting means for interchanging the sequence of said switching stages in the series configuration so that the starting location of the sequence can be changed for each selection operation.

4. The program controlled data processing system defined in claim 3, wherein each said switching stage comprises means for selecting a single binary character when a given switching stage is selected.

5. The program controlled data processing system defined in claim 2, further comprising:

an additional operation register in said information processing means having inputs connected to at least one of said program memory or external means controlled by said system, said additional register being adapted to receive a number of signals corresponding to the number of signals received by said operation register whereby the starting point of the sequence to be considered in the selection is determined utilizing the binary signal different from the remaining binary signals.

6. The program controlled data processing system defined in claim 5, wherein said selection circuit means includes a plurality of switching stages individually assigned to binary signals to be processed, a cascade circuit of unidirectional conduction means contained individually in said switching stages, and further comprising:

means for connecting each switching stage to a potential corresponding to the binary signal in question, said switching stages being coupled through interconnection of contact means, only those contact means being non-conducting to which the binary signal determined as the starting point of the sequence is assigned.

7. The program controlled data processing system defined in claim 1, wherein said information to be processed comprises signals from a plurality of simultaneously requesting telephone subscriber circuits, said selection means determining which subscriber connection is to be processed.

* * * * *